(12) United States Patent  
Kim

(10) Patent No.: US 11,537,011 B2  
(45) Date of Patent: Dec. 27, 2022

(54) DISPLAY DEVICE

(71) Applicant: Samsung Display Co., LTD., Yongin-si (KR)

(72) Inventor: Byoung Yong Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/011,918

(22) Filed: Sep. 3, 2020

(65) Prior Publication Data

US 2021/0063803 A1    Mar. 4, 2021

(30) Foreign Application Priority Data

Sep. 4, 2019    (KR) .......................... 10-2019-0109424

(51) Int. Cl.
*G02F 1/1345*    (2006.01)
*G02F 1/1368*    (2006.01)
*G02F 1/1362*    (2006.01)

(52) U.S. Cl.
CPC ........ *G02F 1/13452* (2013.01); *G02F 1/1368* (2013.01); *G02F 1/13458* (2013.01); *G02F 1/136286* (2013.01)

(58) Field of Classification Search
CPC ............... G02F 1/13452; G02F 1/1345; G02F 1/13456; G02F 1/13458; G02F 1/136286
See application file for complete search history.

(56) References Cited

U.S. PATENT DOCUMENTS

2015/0179670 A1* 6/2015 Kang .................... G02F 1/1368  
257/773  
2017/0082888 A1* 3/2017 Park .................... G02F 1/13452

(Continued)

FOREIGN PATENT DOCUMENTS

KR    10-2014-0128668    11/2014  
KR    10-2017-0005254    1/2017

OTHER PUBLICATIONS

European Search Report dated Dec. 17, 2020 in European Application No. 20194125.9.

*Primary Examiner* — Jia X Pan  
(74) *Attorney, Agent, or Firm* — H.C. Park & Associates, PLC

(57) ABSTRACT

A display device includes a first substrate including a display area including pixels, a non-display area disposed around the display area, and a base substrate, a second substrate facing the first substrate, and a printed circuit board attached to side surfaces of the first substrate and the second substrate, wherein the first substrate includes a plurality of connection wirings connected to the pixels, arranged on the base substrate, extending along a first direction, and spaced apart from each other along a second direction intersecting the first direction, and a plurality of connection pads arranged on the side surface of the first substrate and the side surface of the second substrate, connected to the connection wirings, extending along a thickness direction, and spaced apart from each other along the second direction, the first substrate further includes a coupling member disposed between the printed circuit board and the side surface of the first substrate and between the printed circuit board and the side surface of the second substrate, and the coupling member includes a non-conductive film portion disposed to overlap the connection wirings along the first direction, and a conductive film portion disposed around the non-conductive film portion.

20 Claims, 16 Drawing Sheets

(56) References Cited

U.S. PATENT DOCUMENTS

| | | | |
|---|---|---|---|
| 2017/0357121 A1* | 12/2017 | Cho | G02F 1/1368 |
| 2017/0358602 A1* | 12/2017 | Bae | H05K 1/117 |
| 2018/0061367 A1* | 3/2018 | Ye | G02F 1/13452 |
| 2018/0088388 A1* | 3/2018 | Furuta | G02F 1/13452 |
| 2018/0336818 A1 | 11/2018 | Zheng et al. | |
| 2019/0035760 A1 | 1/2019 | Li et al. | |
| 2019/0204638 A1* | 7/2019 | Park | G02F 1/1333 |
| 2019/0204652 A1 | 7/2019 | Lee et al. | |

* cited by examiner

DISPLAY DEVICE

CROSS REFERENCE TO RELATED APPLICATION

This application claims priority from and the benefit of Korean Patent Application No. 10-2019-0109424, filed on Sep. 4, 2019, which is hereby incorporated by reference for all purposes as if fully set forth herein.

BACKGROUND

Field

Exemplary embodiments/implementations of the invention relate generally to a display device and, more specifically, to a display device that minimize a non-display area.

Discussion of the Background

A display device is a device that shows a moving image or a still image. The display device may be used as a display screen of not only portable electronic appliances such as a mobile phone, a smart phone, a tablet personal computer (PC), a smart watch, a watch phone, a mobile communication terminal, an electronic notebook, an electronic book, a portable multimedia player (PMP), a navigator, and a ultra mobile PC (UMPC), but also various products such as a television, a notebook, a monitor, a billboard, and the Internet of Things (IoT).

In order to drive the light emitting element of a display device, a printed circuit board including a driving circuit, a plurality of signal wirings electrically connected to the light emitting element, and a plurality of lead wirings connected to the plurality of signal wirings is required. The display device includes a display area that shows an image, and a non-display area that surrounds the display area but does not present an image, that is, a bezel area. In this case, in order to make a display device without a bezel area, the signal wirings and the lead wirings may be bonded to each other at the side of the display device.

The above information disclosed in this Background section is only for understanding of the background of the inventive concepts, and, therefore, it may contain information that does not constitute prior art.

SUMMARY

Devices constructed/methods according to exemplary implementations/embodiments of the invention are capable of preventing signal interference due to misalignment of connection wirings and connection pads.

According to one or more implementations/embodiments of the invention, a display device includes a first substrate including a display area including pixels, a non-display area disposed around the display area, and a base substrate, a second substrate facing the first substrate, and a printed circuit board attached to side surfaces of the first substrate and the second substrate, wherein the first substrate includes a plurality of connection wirings connected to the pixels, arranged on the base substrate, extending along a first direction, and spaced apart from each other along a second direction intersecting the first direction, and a plurality of connection pads arranged on the side surface of the first substrate and the side surface of the second substrate, connected to the connection wirings, extending along a thickness direction, and spaced apart from each other along the second direction, the first substrate further includes a coupling member disposed between the printed circuit board and the side surface of the first substrate and between the printed circuit board and the side surface of the second substrate, and the coupling member includes a non-conductive film portion disposed to overlap the connection wirings along the first direction, and a conductive film portion disposed around the non-conductive film portion.

The connection pad may be directly connected to the connection wiring.

The connection pad may be partially misaligned with the connection wiring along the second direction.

The conductive film portion may be disposed not to overlap the connection wiring along the first direction.

The conductive film portion may include a first base layer and conductive balls dispersed in the first base bonding layer.

The printed circuit board may include a lead wiring disposed to overlap the connection pad along the first direction, and the lead wiring may be electrically connected to the connection pad through the conductive balls.

The non-conductive film portion may include a second base bonding layer.

The viscosity of the second base bonding layer may be higher than the viscosity of the first base bonding layer.

The conductive film portion may include a first conductive film portion disposed at one side of the non-conductive film portion in the thickness direction, and a second conductive film portion disposed at the other side of the non-conductive film portion in the thickness direction.

The first conductive film portion may be disposed to overlap the base substrate along the first direction, and the second conductive film portion may be disposed to overlap the second substrate along the first direction.

The connection wiring may include Ti/Al/Ti or Mo, and the connection pad may include Ag, Au, or Cu.

The display device may further include: a main circuit board connected to the printed circuit board, wherein the printed circuit board may further include a data driving integrated circuit.

The first substrate may include a thin film transistor substrate, and the second substrate may include an encapsulation substrate.

The display device may further include a liquid crystal layer disposed between the first substrate and the second substrate, and a backlight unit disposed under the first substrate.

The conductive film may surround the non-conductive film portion in a plan view.

The non-conductive film portion may include a first non-conductive film portion disposed to overlap the connection wiring along the first direction, and a second non-conductive film portion disposed not to overlap the connection wiring along the first direction, and the first non-conductive film portion may protrude from the second non-conductive film portion in a thickness direction.

The non-conductive film portion may include a first non-conductive film portion disposed to overlap the connection wiring along the first direction, and a second non-conductive film portion disposed not to overlap the connection wiring along the first direction, and the second non-conductive film portion may protrude from the first non-conductive film portion in a thickness direction.

According to another embodiment, a display device includes a first substrate including a display area including pixels, a non-display area disposed around the display area, and a base substrate, and a second substrate facing the first substrate, wherein the first substrate includes a connection wiring connected to the pixels, disposed on the base substrate, and extending along a first direction, and a connection pad disposed on the side surface of the first substrate and the side surface of the second substrate, connected to the connection wiring, and extending along a thickness direction, the first substrate further includes a coupling member disposed on the side surface of the first substrate and the side surface of the second substrate, the coupling member includes a non-conductive film portion disposed to overlap the connection wirings along the first direction, and a conductive film portion disposed around the non-conductive film portion, the conductive film portion includes a first base bonding layer and conductive balls dispersed in the first base bonding layer, the non-conductive film portion includes a second base bonding layer, and viscosity of the second base bonding layer is higher than viscosity of the first base bonding layer.

The display device may further include a printed circuit board attached to side surfaces of the first substrate and the second substrate, wherein the coupling member is disposed between the printed circuit board and the side surface of the first substrate and between the printed circuit board and the side surface of the second substrate.

The printed circuit board may include a lead wiring disposed to overlap the connection pad along the first direction, and the lead wiring may be electrically connected to the connection pad through the conductive balls.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
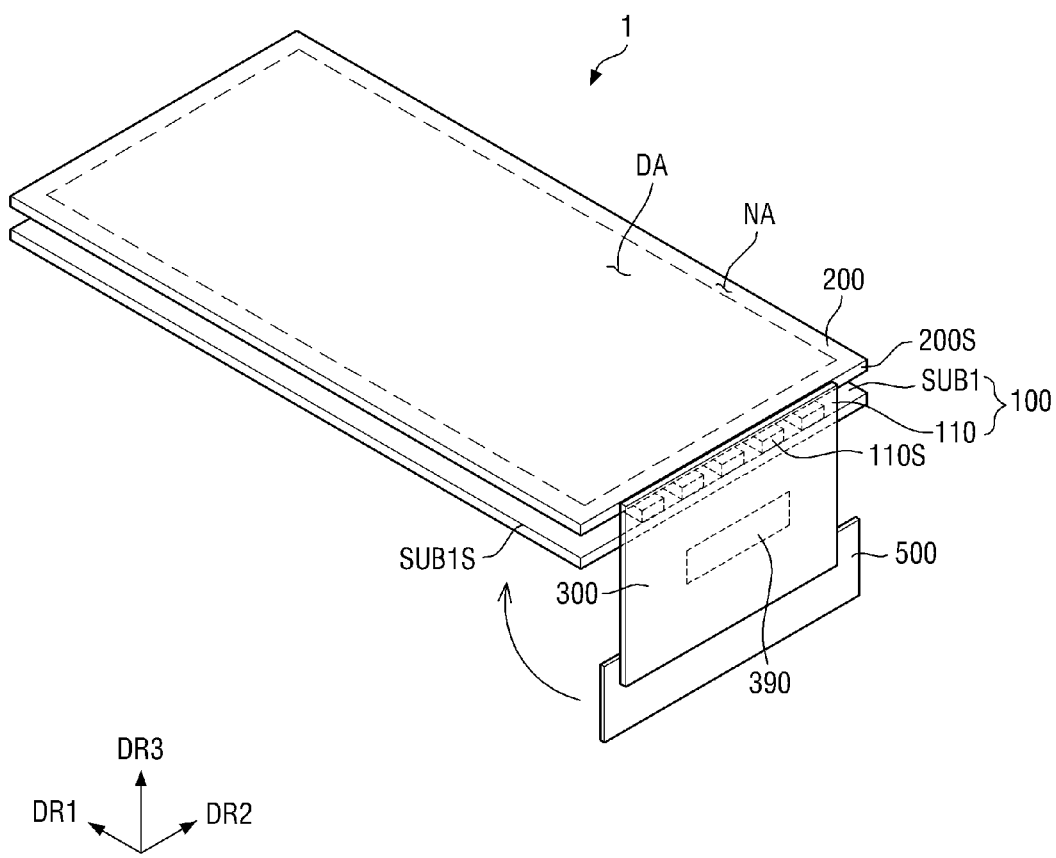
FIG. 1 is a perspective view of a display device constructed according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

FIG. 1 is a perspective view of a display device according to an embodiment.

Referring to FIG. 1, a display device 1 includes a display panel having, a printed circuit board 300 connected to one side surface of the display substrates 100 and 200, and a main circuit board 500 connected to the printed circuit board 300.

The display panel may include a first substrate 100, a second substrate 200, various elements arranged on the first substrate 100, and various elements arranged on the second substrate 200.

The display panel may be, for example, an organic light emitting display panel. In the following embodiments, there is exemplified a case where an organic light emitting display panel is used as the display panel, but the present disclosure is not limited thereto. For example, as the display panel, different kinds of display panels such as a liquid crystal display (LCD) panel, a quantum dot organic light emitting display (QD-OLED) panel, a quantum dot liquid crystal display (QT-LCD) panel, and a micro light emitting display (Micro LED) panel may be used.

The various elements of the first substrate 100 may include a plurality of insulating layers, a plurality of conductive layers, at least one thin film transistor, and an organic light emitting element connected to the at least one thin film transistor.

That is, the first substrate 100 may be a back plate substrate including the at least one thin film transistor, or a thin film transistor substrate.

The second substrate 200 may be disposed on the first substrate 100 to face the first substrate 100. The second substrate 200 may include an encapsulation substrate for encapsulating the organic light emitting element of the first substrate 100.

Each of the first substrate 100 and the second substrate 200 may include a base substrate. The base substrate of each of the first substrate 100 and the second substrate 200 may include a rigid material such as glass or quartz. For example, the first substrate 100 may include a first base substrate SUB1.

The first substrate 100 may further include a connection wiring 110 disposed between the first base substrate SUB1 and the second substrate 200.

The display panel may have a rectangular shape having flat corners in a plan view. The display panel may have long sides and short sides in a plan view. The short sides of the display panel may be sides extending in the second direction DR2. The long sides of the display panel may be sides extending in the first direction DR1. The first substrate 100 and the second substrate 200 may have substantially the same planar shape.

The lower short sides of the first substrate 100 and the second substrate 200 in the second direction DR2 are polished, and thus one side surface of the first substrate 100 and one side surface of the second substrate 200 may be aligned along a thickness direction (third direction DR3). In other sides of the first substrate 100 and the second substrate 200, the side surfaces of the first substrate 100 and the second substrate 200 may be aligned along the thickness direction, but the present invention is not limited thereto.

Hereinafter, one polished side surface 100S of the first substrate 100 and one polished side surface 200S of the second substrate 200 are referred to as a first side surface of the first substrate 100 and a second side surface of the second substrate 200, respectively.

The first substrate 100 may include a display area DA and a non-display area NA disposed around the display area DA. A plurality of pixels may be disposed in the display area DA of the first substrate 100. The pixel may include at least one thin film transistor and an organic light emitting element. Although not shown, the non-display area NA of the first substrate 100 may further include a sealing area. The sealing area may be disposed in the non-display area NA, and may be continuously disposed along the edges of the first substrate 100 and the second substrate 200. A sealing member including a frit or the like may be disposed in the sealing area. The sealing member may be disposed between the first substrate 100 and the second substrate 200 to couple the first substrate 100 and the second substrate 200.

The display area DA may have a rectangular shape having vertical corners or a rectangular shape having rounded corners in a plan view. The planar shape of the display area DA may be substantially the same as the aforementioned planar shape of the display panel 100 and 200. That is, the display area DA may have short sides and long sides. The long sides of the display area DA may be sides extending in the first direction DR1. The short sides of the display area DA may be sides extending in the second direction DR2. However, the planar shape of the display area DA is not limited to the rectangular shape, but the display area DA may have a circular shape, an elliptical shape, or other various shapes.

The non-display area NA may be disposed around the display area DA. The non-display area NA may be disposed adjacent to both short sides and long sides of the display area DA. In this case, the non-display area NA may surround all sides of the display area DA, and may constitute edges of the display area DA. However, the present invention is not limited thereto, and the non-display area NA may be disposed adjacent only to both short sides and/or long sides of the display area DA.

The sealing area may have a rectangular frame shape that is continuously disposed along the edge regions of the first substrate 100 and the second substrate 200.

The connection wiring 110 may extend from the display area DA of the first substrate 100 to the non-display area NA thereof (lower sides in the first direction DR1). The connection line 110 may be electrically connected to the pixel of the display area DA. The connection wiring 110 may extend to the first substrate 100 and the first side surface of the second substrate 200, and the first side surface 110s of the connection wiring 110. The first substrate 100, and the first side surface of the second substrate 200 may be aligned along the thickness direction.

The first base substrate SUB1 of the first substrate 100, like the first side surface of the first substrate 100, may include a first side surface SUB1S. The first side surface SUB1S of the first base substrate SUB1, the first side surface 110s of the connection wiring 110, and the first side surface of the second substrate 200 may be aligned along the thickness direction.

A plurality of connection wirings 110 may be provided. The plurality of connection wirings 110 may be disposed to be spaced apart from each other along the second direction DR2. Although it is shown in the drawings that five connection lines 110 are provided, six connection lines 110 may be provided.

The connection wiring 110 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

The first substrate 100 may further include a connection pad disposed on the connection wiring 110. The connection pad and the connection wiring 110 may be directly connected to each other. The connection pad may be disposed corresponding to the connection wiring 110. A plurality of connection pads may be provided.

The printed circuit board 300 may be attached onto the first substrate 100 and the first side surface of the second substrate 200. The printed circuit board 300 may be electrically connected to the plurality of connection wirings 110 and the plurality of connection pads.

The printed circuit board 300 may further include a driving integrated circuit 390. The driving integrated circuit 390 may be electrically connected to the plurality of connection wirings 110 through lead wirings to be described later.

Although it is shown in FIG. 1 that the printed circuit board 300 is attached only to the first side surface of the display panel, the present invention is not limited thereto, and the printed circuit board 300 may also be disposed on at least one of the first side surface of the display panel and other side surfaces thereof.

One end of the printed circuit board 300 may be attached to the display panel 100 and 200, and the other end of the printed circuit board 300, opposite to the one end thereof, may be attached to the main circuit board 500.

The printed circuit board 300 may be attached onto the connection pads of the first substrate 100 using an anisotropic conductive film. Thus, the lead wirings of the printed circuit board 300 may be electrically connected to the connection pads of the first substrate 100. The printed circuit board 300 may be a flexible printed circuit board, a printed circuit board, or a flexible film such as a chip on film.

The driving integrated circuit 390 may be, for example, a data driving integrated circuit, and a chip on film (COF) implemented as a data driving chip may be applied.

The main circuit board 500 may be connected to the other end of the printed circuit board 300.

Although not shown, the display device 1 may further include a touch electrode unit disposed on the second substrate 200. The touch electrode unit may be formed directly on the second substrate 200.

The touch electrode unit may further include touch electrodes arranged in a touch sensor area to detect a user's touch.

However, the present invention is not limited thereto, and the touch electrode unit may be formed as a member separately provided from the display panel 100 and 200.

As shown in FIG. 1, the printed circuit board 300 and the main circuit board 500 may be disposed to be bent toward the lower portion of the first substrate 100. That is, the printed circuit board 300 and the main circuit board 500 may be disposed under the first substrate 100.

Figure 2:
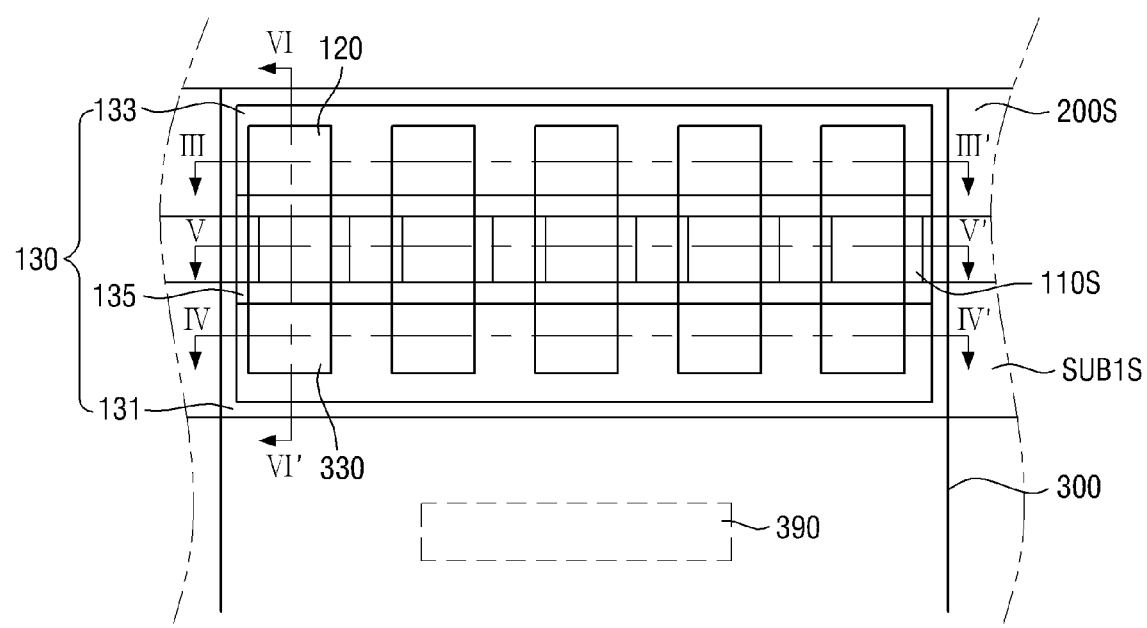
FIG. 2 is a side view of a display device constructed according to an exemplary embodiment of the invention.
Figure 2:
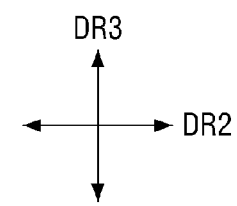
Figure 3:
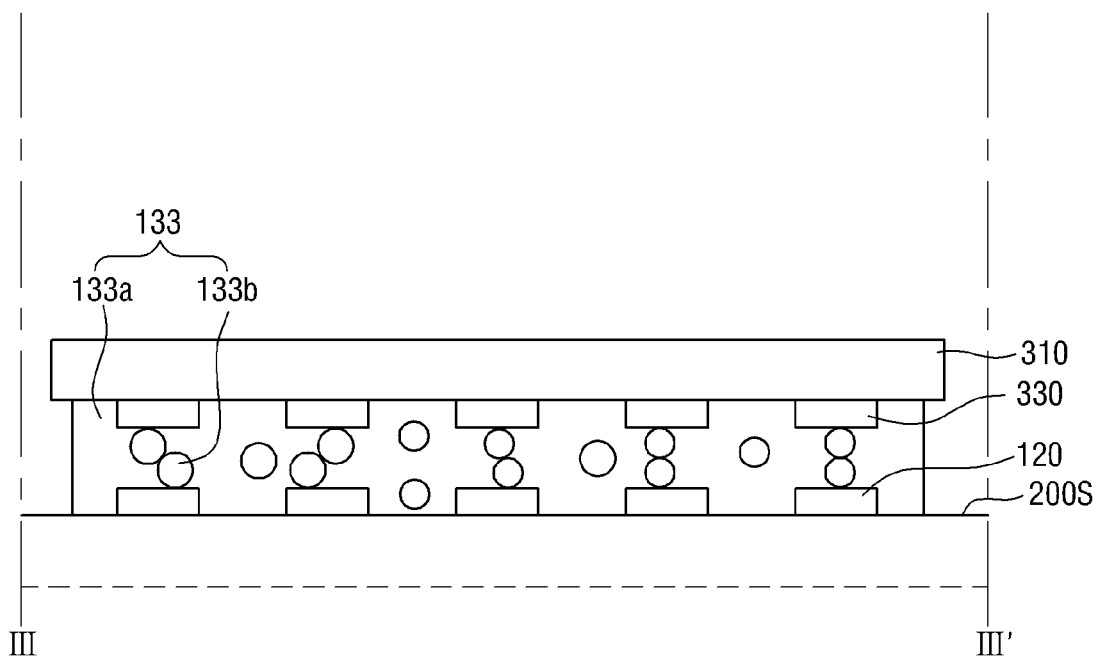
FIG. 3 is a cross-sectional view taken along the line III-III' of FIG. 2.
Figure 4:
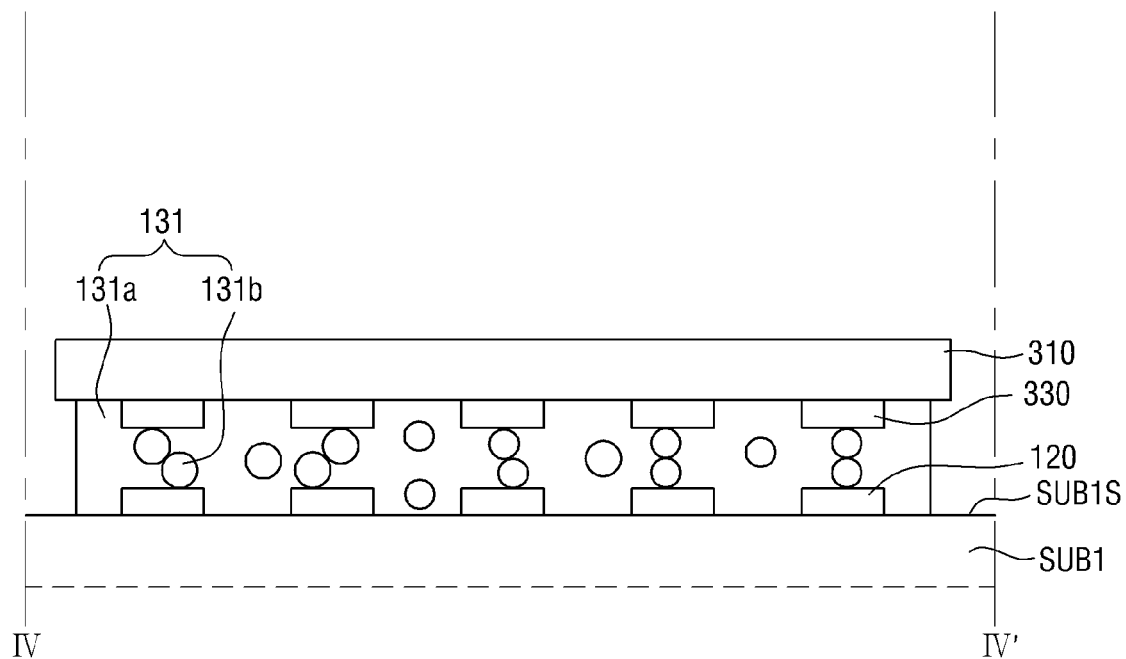
FIG. 4 is a cross-sectional view taken along the line IV-IV' of FIG. 2.
Figure 5:
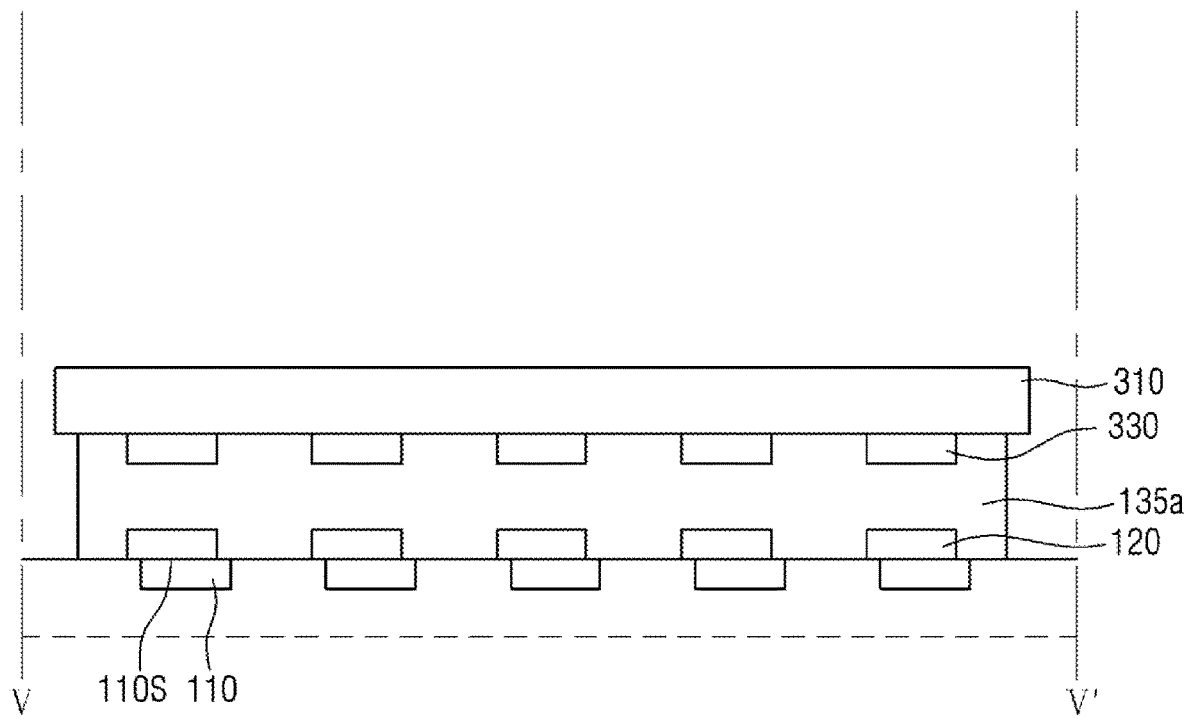
FIG. 5 is a cross-sectional view taken along the line V-V' of FIG. 2.
Figure 6:
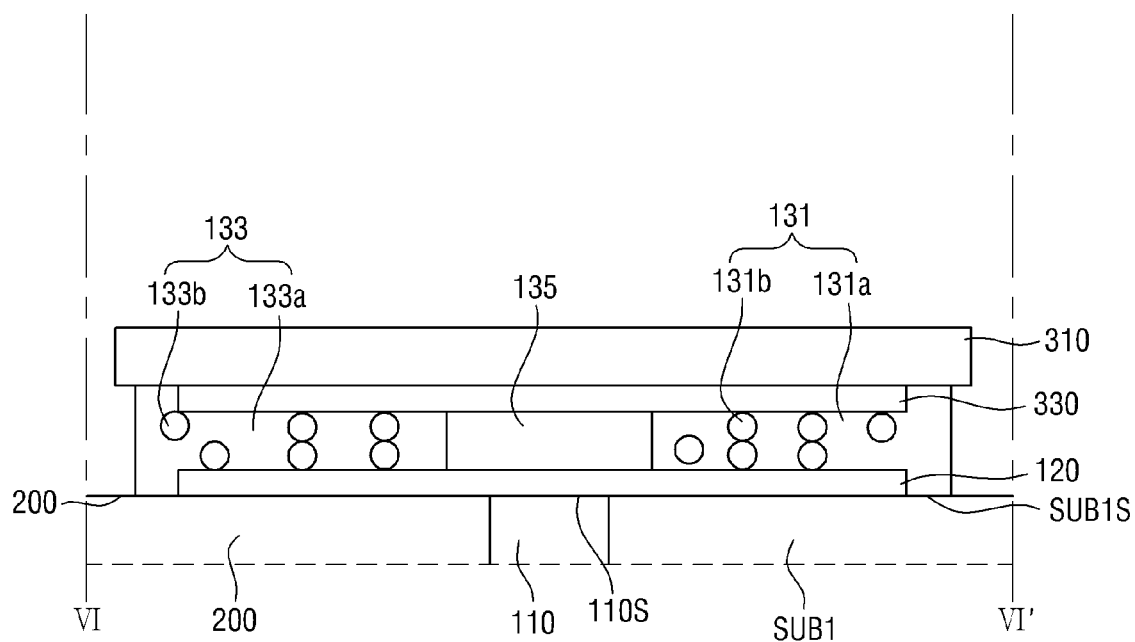
FIG. 6 is a cross-sectional view taken along the line VI-VI' of FIG. 2.

FIG. 2 is a side view of a display device according to an embodiment, FIG. 3 is a cross-sectional view taken along the line III-III' of FIG. 2, FIG. 4 is a cross-sectional view taken along the line IV-IV' of FIG. 2, FIG. 5 is a cross-sectional view taken along the line V-V' of FIG. 2, and FIG. 6 is a cross-sectional view taken along the line VI-VI' of FIG. 2.

Referring to FIGS. 2 to 6, the connection pads 120 may be disposed on the first side surface SUB1S of the first base substrate SUB1 of the first substrate 100, the first side surfaces 110s of the plurality of connection wirings 110, and the first side surface 200S of the second substrate 200. The connection pads 120 may be disposed to be spaced apart from each other along the second direction DR2.

The connection pads 120 may have a line shape extending along the third direction DR3. The connection pads 120 may be disposed to overlap the connection wirings 110 along the first direction DR1. As shown in FIG. 2, the connection pads 120 and the connection wirings 110, corresponding to each other, may be misaligned along the second direction DR2.

The connection pads 120 may include silver (Ag), gold (Au), or copper (Cu).

More specifically, cylindrical connection pads may be formed on the first side surface SUB1S of the first base substrate SUB1 of the first substrate 100, the first side surfaces 110s of the plurality of connection wirings 110, and the first side surface 200S of the second substrate 200, which are polished. The cylindrical connection pads may be formed on the first side surface SUB1S of the first base substrate SUB1 of the first substrate 100, the first side surfaces 110s of the plurality of connection wirings 110, and the first side surface 200S of the second substrate 200 in the form of Ag film, Ag paste, Cu paste, or Au paste.

However, the present invention is not limited thereto, and the cylindrical connection pads may be formed on the first side surface SUB1S of the first base substrate SUB1 of the first substrate 100, the first side surfaces 110s of the plurality of connection wirings 110, and the first side surface 200S of the second substrate 200 by a sputtering process of depositing silver (Ag), gold (Au), or copper (Cu).

Subsequently, as shown in FIG. 2, the cylindrical connection pads may be formed into a plurality of connection pads 120 spaced apart from each other through laser patterning.

That is, the connection pads 120 and the connection wirings 110, corresponding to each other along the first direction DR1, may be misaligned with each other along the second direction DR2 without completely overlapping each other along the first direction DR1.

A coupling member 130 may be disposed between the plurality of connection pads 120 and the plurality of lead wirings 330 of the printed circuit board 300. When the coupling member 130 includes a conductive material in an area overlapping the connection wirings 110 along the first direction DR1, a short circuit may occur due to the misalignment of the connection wirings 110 and the connection pads 120 disposed adjacent to the connection wirings 110 by the conductive material.

Specifically, as shown in FIG. 2, a short circuit may occur due to a portion protruding from the connection pad 120 corresponding to the connection wiring 110 in the right direction of the second direction DR2, a portion protruding from the connection wiring 110 corresponding to the adjacent connection pad 120, and the conductive material. For example, the width of the portion protruding from the connection pad 120 corresponding to the connection wiring 110 in the right direction of the second direction DR2 may be about 5 μm, and the pitch of the adjacent connection pad 120 may be about 22 μm. In the misalignment of the corresponding connection wiring 110, the connection wiring 110 disposed adjacent to the connection pad 120, and the connection pad 120, the alignment tolerance may be −5 μm to +5 μm during the laser patterning process of the connection pads 120.

In this case, signal interference may cause the display device 1 failure. However, since the display device 1 according to an embodiment includes a non-conductive film portion in which the coupling member 130 does not include a conductive material in an area where the connection pad 120 and the connection wiring 110 overlap each other along the first direction DR1, it is possible to prevent a short circuit from occurring due to a portion protruding from the connection pad 120 corresponding to the connection wiring 110 in the right direction of the second direction DR2, a portion protruding from the connection pad 120 corresponding to the connection wiring 110 in the left direction of the second direction DR2, and the conductive material.

As shown in FIG. 2, the coupling member may include a plurality of divided portions 131, 133, and 135. The plurality of divided portions 131, 133, and 135 may include a non-conductive portion 135 and conductive film portions disposed around the non-conductive portion 135. The conductive film portions may include a first conductive film portion 131 located under the non-conductive portion 135 in the third direction DR3 and a second conductive film portion 133 located over the non-conductive portion 135 in the third direction DR3.

The non-conductive film portion 135 may be disposed to overlap the plurality of connection wirings 110 along the first direction DR1. The non-conductive film portion 135 may also be disposed to overlap a space between the plurality of connection wirings 110 spaced apart from each other along the second direction DR2.

The non-conductive film portion 135 may be disposed to partially overlap the first side surface SUB1S of the first base substrate SUB1 of the first substrate 100 and the first side surface 200S of the second substrate 200 along the first direction DR1.

The conductive film portions 131 and 133 may be disposed around the non-conductive film portion 135. The size of the region on the side surface of the conductive film portions 131 and 133 may be larger than the size of the region on the side surface of the non-conductive film portion 135.

The first conductive film portion 131 may be located under the non-conductive film portion 135 in the third direction DR3, and the second conductive film portion 133 may be located over the non-conductive film portion 135 in the third direction DR3.

The non-conductive film part 135 may be disposed between the first conductive film portion 131 and the second conductive film portion 133, and may physically connect the first conductive film portion 131 and the second conductive film portion 133.

The conductive film portions 131 and 133 may include substantially the same material, but maybe different material from the non-conductive film portion 135.

The planar size of the coupling member 130 may be smaller than the planar size of the printed circuit board 300, but the present invention is not limited thereto.

As shown in FIGS. 3 and 4, the connection pads 120 may be disposed on the first side surface 200S of the second substrate 200 and the first side surface SUB1S of the first base substrate SUB1 of the first substrate 100. The first conductive film portion 131 may include a first base bonding layer 131a and a plurality of first conductive balls 131b dispersed in the first base bonding layer 131a, and the second conductive film portion 133 may include a second base bonding layer 133a and a plurality of second conductive balls 133b dispersed in the second base bonding layer 133a. The first and second base bonding layers 131a and 133a may include the same material as each other. The first and second base bonding layers 131a and 133a may include a first insulating resin. The first insulating resin may have higher viscosity than a second insulating resin of a third base bonding layer 135a to be described later.

The printed circuit board 300 may include a printed base film 310 and a plurality of lead wirings 330 disposed on the printed base film 310. The lead wirings 330 may be disposed on the lower surface of the printed base film 310. As shown in FIG. 2, the plurality of lead wirings 330 may overlap the respective connection pads 120 along the first direction DR1. Although it is shown in FIG. 2 that the connection pads 120 are disposed to completely overlap the lead wirings 330 along the first direction DR1, the connection pads 120 and the lead wirings 330 may be partially misaligned.

Referring to FIGS. 3 and 4, the first and second conductive balls 131b and 133b may serve to electrically connect the lead wirings 330 and the connection pads 120. The first and second base bonding layers 131a and 133a may serve to bond the printing base film 310 and the first substrate 100, or bond the printing base film 310 and the second substrate 200. The first and second base bonding layers 131a and 133a may cover all the side surfaces of the lead wirings 330 and the connection pads 120 and may be in direct contact with all the side surfaces of the lead wirings 330 and the connection pads 120.

Unlike the conductive film portions 131 and 133, the non-conductive film portion 135 may not include conductive balls. As described above, the misalignment of the connection pads 120 and the connection wirings 110, corresponding to each other, may occur along the first direction DR1. In this case, the coupling member 130 according to an embodiment may include the non-conductive film portion 135 in an area overlapping the connection wirings 110 along the first direction DR1, thereby preventing a short circuit due to the misalignment of the connection wirings and the connection pads 120 adjacent to the connection wirings by the conductive material. Thus, the occurrence of signal interference between the adjacent wirings may be prevented, thereby reducing the failure of the display device 1.

Referring to FIG. 6, the connection pad 120 may be disposed on the first side surface SUB1S of the first base substrate SUB1 of the first substrate 100, the first side surface 200S of the second substrate 200, and the first side surface 110s of the connection wiring 110. The coupling member 130 may be disposed between the connection pad 120 and the lead wiring 330. In the drawings, the non-conductive film part 135 may be disposed on the center of the connection pad 120, the first conductive film part 131 may be disposed on a lower part of the connection pad 120 in the third direction DR3, and the second conductive film portion 133 may be disposed on an upper part of the connection pad 120 in the third direction DR3. The coupling member 130 may be in direct contact with the connection pad 120 and the lead wiring 330.

Figure 7:
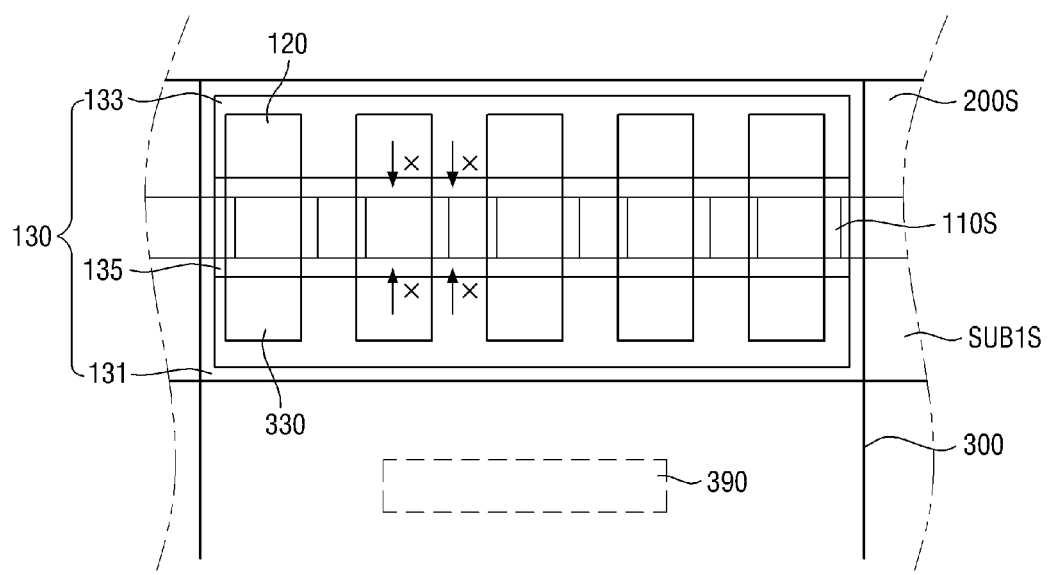
FIG. 7 is a side view showing a case where a material of a conductive film portion is not introduced into a non-conductive film portion from the conductive film portion.
Figure 7:
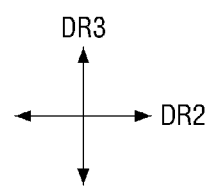
Figure 8:
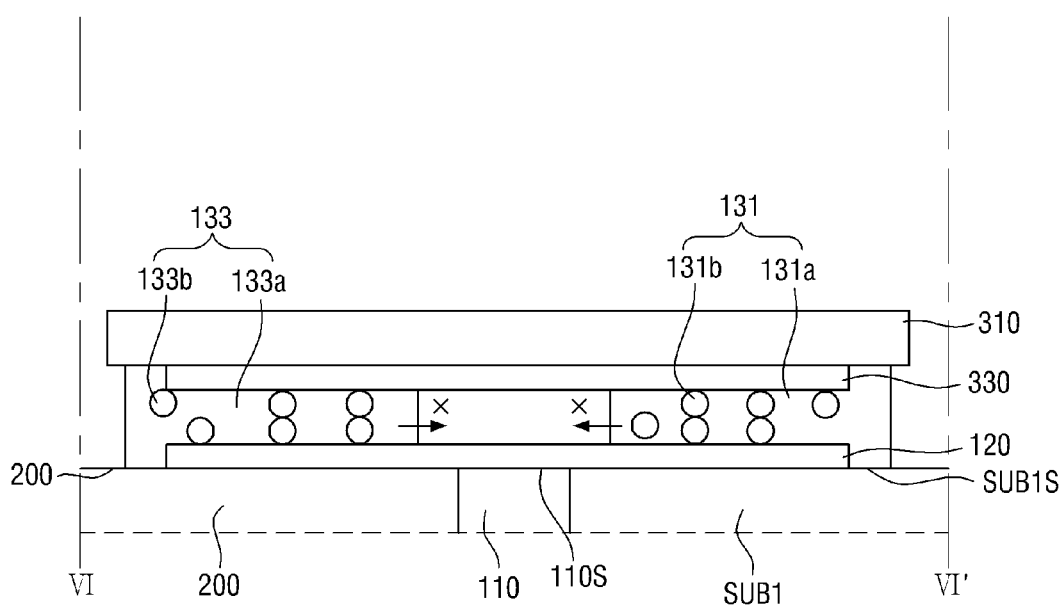
FIG. 8 is a cross-sectional view showing a case where a material of a conductive film portion is not introduced into a non-conductive film portion from the conductive film portion.

FIG. 7 is a side view showing a case where a material of a conductive film portion is not introduced into a non-conductive film portion from the conductive film portion, and FIG. 8 is a cross-sectional view showing a case where a material of a conductive film portion is not introduced into a non-conductive film portion from the conductive film portion.

Referring to FIGS. 7 and 8, as described above, the third base bonding layer 135a may include a different material from the first and second base bonding layers 131a and 133a. The third base bonding layer 135a may include a second insulating resin different from the first insulating resin. The second insulating resin may have higher viscosity than the first insulating resin. That is, the viscosity of the third base bonding layer 135a may be higher than the viscosity of each of the first and second base bonding layers 131a and 133a.

Thus, it is possible to prevent the constituent materials 131a, 131b, 133a, and 133b of the first and second conductive film portions 131 and 133 from being introduced into an area where the connection pad 120 and the connection wiring 110 are disposed to overlap each other along the first direction DR1. More specifically, when the viscosity of the third base bonding layer 135a may be higher than the viscosity of each of the first and second base bonding layers 131a and 133a, the conductive balls 131b and 133b dispersed in the first and second base bonding layers 131a and 133a may be less likely to be introduced into the third base bonding layer 135a. When the conductive balls 131b and 133b dispersed in the first and second base bonding layers 131a and 133a are introduced into the third base bonding layer 135a, the non-conductive film portion includes the conductive balls 131b and 133b even though the conductive balls are not arranged in the third base bonding layer 135a, there is a high possibility that a short circuit occurs due to the misalignment of the connection wiring 110 corresponding to the introduced conductive balls, the connection wiring 110 disposed adjacent to the connection pad 120, and the connection pad 120.

However, in the display device 1 according to an embodiment, since the third base bonding layer 135a has higher viscosity than each of the first and second base bonding layers 131a and 133a, it may reduce the possibility of the conductive balls 131b and 133b dispersed in the first and second base bonding layers 131a and 133a being introduced into the third base bonding layer 135a, preventing a short circuit.

Hereinafter, other embodiments will be described. In the following embodiments, the same components as those in the already described embodiments are indicated by the same reference numerals, and descriptions thereof will be omitted or simplified.

Figure 9:
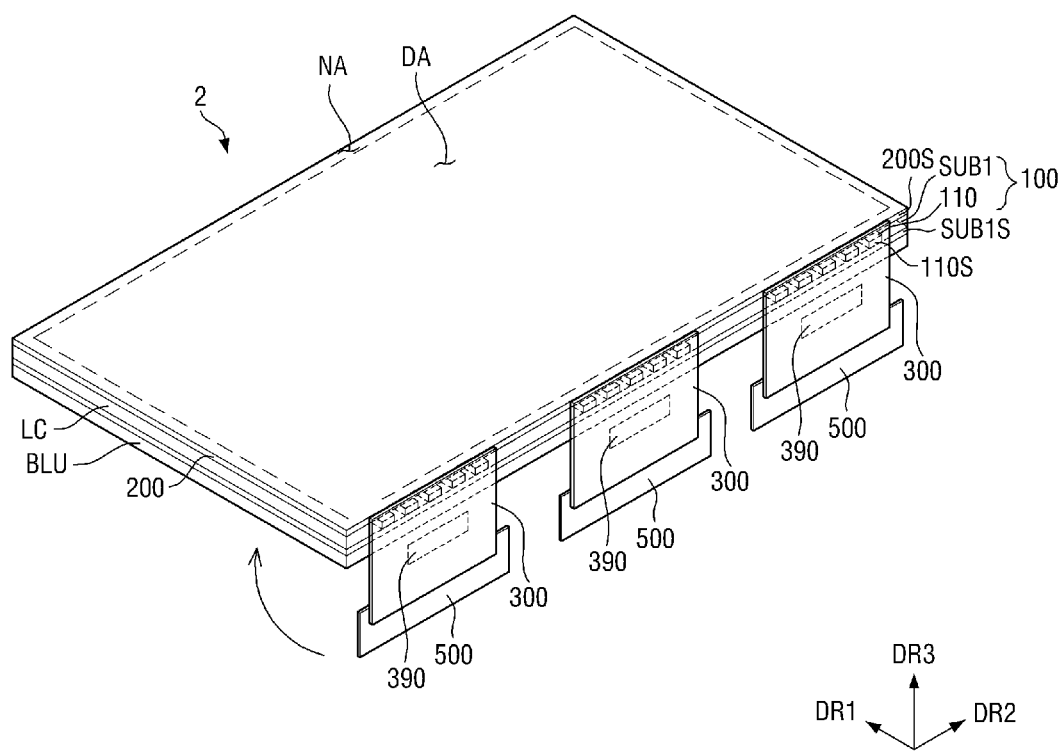
FIG. 9 is a perspective view of a display device constructed according to another exemplary embodiment of the invention.

FIG. 9 is a perspective view of a display device according to another embodiment.

Referring to FIG. 9, a display device 2 according to the present embodiment is different from the aforementioned display device 1 in that a liquid crystal display panel is used as the display panel.

More specifically, the display device 2 according to the present embodiment may further include a liquid crystal layer LC between the first substrate 100 and the second substrate 200, and may further include a backlight unit BLU under the second substrate 200.

Unlike the aforementioned second substrate 200, the second substrate may include a color filter substrate including a color filter layer.

As shown in FIG. 9, in the display device 2 according to the present embodiment, each of the first substrate 100 and the second substrate 200 may have long sides extending along the second direction DR2 and short sides extending along the first direction DR1.

A plurality of printed circuit boards 300 may be provided. The plurality of printed circuit boards 300 may be disposed on the first side surface of the first substrate 100 and the first side surface of the second substrate 200. The plurality of printed circuit boards 300 may be disposed to be spaced apart from each other along the second direction DR2.

Even in the present embodiment, a short circuit may occur due to a portion protruding from the connection pad 120 corresponding to the connection wiring 110 in the right direction of the second direction DR2, a portion protruding from the connection wiring 110 corresponding to the adjacent connection pad 120, and the conductive material. For example, the width of the portion protruding from the connection pad 120 corresponding to the connection wiring 110 in the right direction of the second direction DR2 may be about 5 μm, and the pitch of the adjacent connection pad 120 may be about 22 μm. In the misalignment of the corresponding connection wiring 110, the connection wiring 110 disposed adjacent to the connection pad 120, and the connection pad 120, the alignment tolerance may be −5 μm to +5 μm during the laser patterning process of the connection pads 120.

In this case, signal interference may occur to cause a display device 2 failure. However, since the display device 2 according to an embodiment includes a non-conductive film portion in which the coupling member 130 does not include a conductive material in an area where the connection pad 120 and the connection wiring 110 overlap each other along the first direction DR1, it is possible to prevent a short circuit due to a portion protruding from the connection pad 120 corresponding to the connection wiring 110 in the right direction of the second direction DR2, a portion protruding from the connection pad 120 corresponding to the connection wiring 110 in the left direction of the second direction DR2, and the conductive material.

Figure 10:
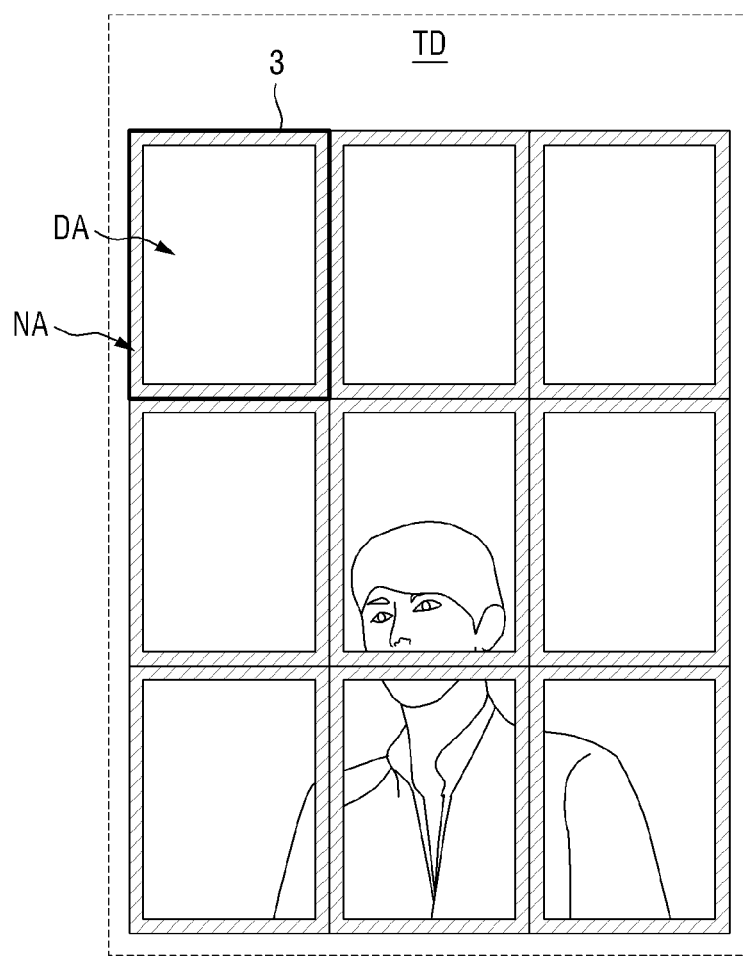
FIG. 10 is a perspective view of a display device constructed according to still another exemplary embodiment of the invention.

FIG. 10 is a perspective view of a display device according to still another embodiment.

Referring to FIG. 10, a display device according to the present embodiment is different from the aforementioned display devices 1 and 2 of FIGS. 1 and 9 in that a tiled display device TD is used.

More specifically, in an exemplary embodiment, a plurality of display devices 3 may be arranged in a grid form, but the present invention is not limited thereto. The plurality of display devices 3 may be arranged to be connected in one direction, may be arranged to be connected in a direction intersecting the one direction, or may be arranged to have a specific shape. The plurality of display devices 3 may have the same size as each other, but the present invention is not limited thereto. The plurality of display devices 3 may have different sizes from each other.

In an exemplary embodiment, the plurality of display devices 3 included in the tiled display device TD may be substantially the same as the display device 1 of FIG. 1 or the display device 2 of FIG. 9. Since each of the display devices 3 has been described with reference to FIGS. 1 and 9, a redundant description will be omitted.

Each of the display devices 3 may be arranged such that long sides or short sides are connected to each other. Some display devices 3 may constitute one side of the tiled display device TD, some display devices 3 may be located at the edge of the tiled display device TD to constitute two adjacent sides of the tiled display device TD, and some display devices 3 may be located inside the tiled display device TD to be surround by other display devices 3. The plurality of display devices 3 may have different bezel shapes according to positions, and may also have the same shape as each other.

The tiled display device TD may have a flat shape of the display devices 3, but the present invention is not limited thereto. The tiled display device TD may have a three-dimensional shape to provide a stereoscopic effect. When the tiled display device TD has a three-dimensional shape, each of the display devices 3 included in the tiled display device TD may have a curved shape, and the display devices 3 may be connected to each other in a planar shape or at a predetermined angle to form the entire tiled display device TD in a three-dimensional shape.

Even in the present embodiment, a short circuit may occur due to a portion protruding from the connection pad 120 corresponding to the connection wiring 110 in the right direction of the second direction DR2, a portion protruding from the connection wiring 110 corresponding to the adjacent connection pad 120, and the conductive material. For example, the width of the portion protruding from the connection pad 120 corresponding to the connection wiring 110 in the right direction of the second direction DR2 may be about 5 μm, and the pitch of the adjacent connection pad 120 may be about 22 μm. In the misalignment of the corresponding connection wiring 110, the connection wiring 110 disposed adjacent to the connection pad 120, and the connection pad 120, the alignment tolerance may be −5 μm to +5 μm during the laser patterning process of the connection pads 120.

In this case, signal interference may occur to cause a display device 3 failure. However, since the display device 3 according to an embodiment includes a non-conductive film portion in which the coupling member 130 does not include a conductive material in an area where the connection pad 120 and the connection wiring 110 overlap each other along the first direction DR1, it is possible to prevent a short circuit from occurring due to a portion protruding from the connection pad 120 corresponding to the connection wiring 110 in the right direction of the second direction DR2, a portion protruding from the connection pad 120 corresponding to the connection wiring 110 in the left direction of the second direction DR2, and the conductive material.

Figure 11:
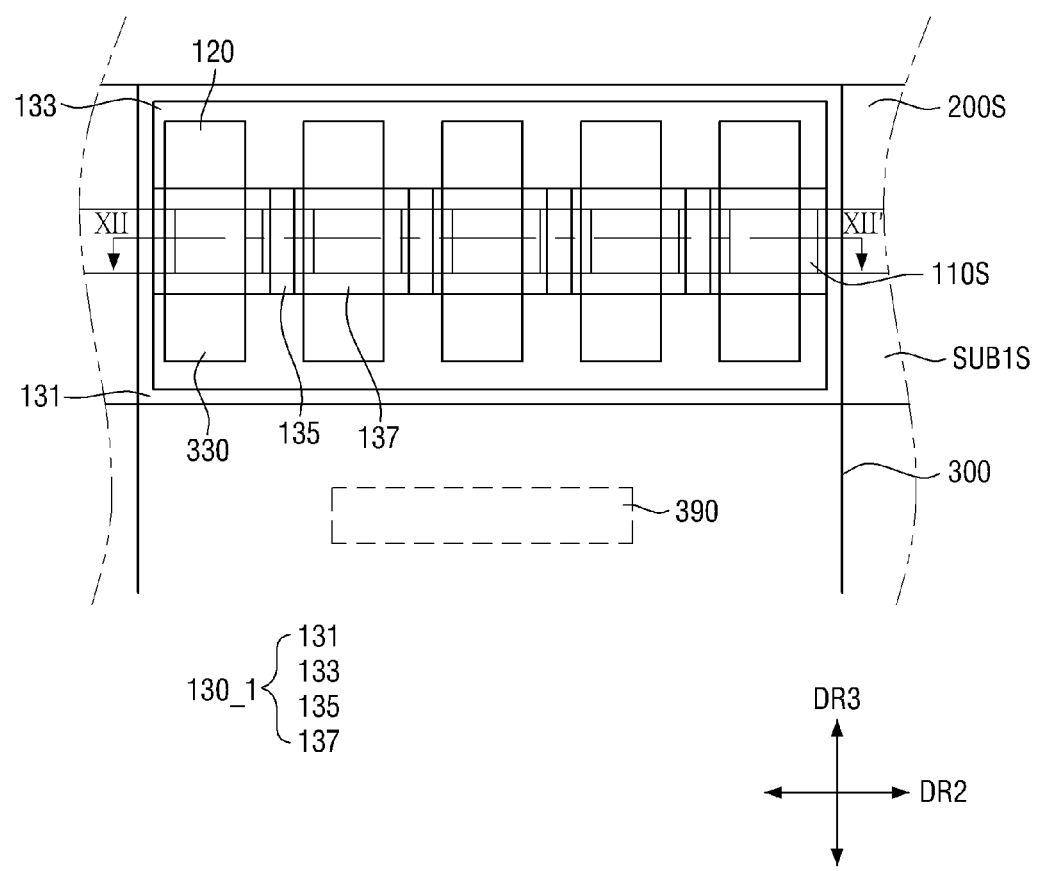
FIG. 11 is a side view of a display device constructed according to another exemplary embodiment of the invention.
Figure 12:
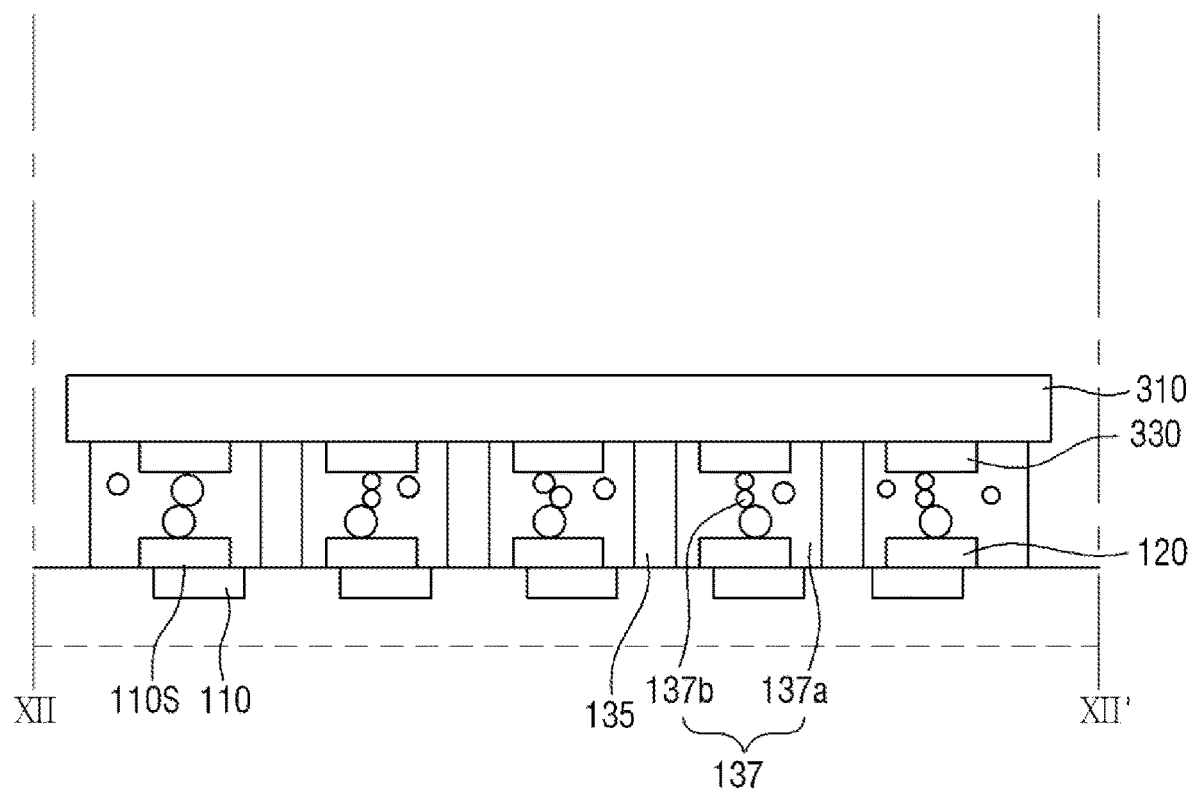
FIG. 12 is a cross-sectional view taken along the line XII-XII' of FIG. 11.

FIG. 11 is a side view of a display device according to another embodiment, and FIG. 12 is a cross-sectional view taken along the line XII-XII' of FIG. 11.

Referring to FIGS. 11 and 12, the display device according to the present embodiment is different from the display device of FIG. 3 in that the arrangement of the non-conductive film portion in a coupling member 130_1 according to FIG. 11 is different from the arrangement of the non-conductive film portion in the coupling member 130 according to FIG. 2.

More specifically, in the coupling member 130_1 according to the present embodiment, the non-conductive film portion 135 may be surrounded by a first conductive film portion 131, a second conductive film 133, and a third conductive film portion 137.

As shown in FIGS. 11 and 12, the non-conductive film portion 135 may be disposed between the adjacent third conductive film portions, and may be disposed not to overlap the connection wiring 110, the connection pad 120, and the lead wiring 330 in the thickness direction.

The third conductive film portion 137 may overlap the connection wiring 110, the connection pad 120, and the lead wiring 330 in the thickness direction. The first conductive film portion 131 may be disposed under the third conductive film portion 137 in the third direction DR3, and the second conductive film portion 133 may be disposed over the third conductive film portion 137 in the third direction DR3.

The third conductive film portion 137 may include a fourth base bonding layer 137a and third conductive balls 137b. The lead wiring 330 may be electrically connected to the connection pad 120 by the third conductive balls 137b.

Even in the present embodiment, a short circuit may occur due to a portion protruding from the connection pad 120 corresponding to the connection wiring 110 in the right direction of the second direction DR2, a portion protruding from the connection wiring 110 corresponding to the adjacent connection pad 120, and the conductive material. For example, the width of the portion protruding from the connection pad 120 corresponding to the connection wiring 110 in the right direction of the second direction DR2 may be about 5 µm, and the pitch of the adjacent connection pad 120 may be about 22 µm. In the misalignment of the corresponding connection wiring 110, the connection wiring 110 disposed adjacent to the connection pad 120, and the connection pad 120, the alignment tolerance may be −5 µm to +5 µm during the laser patterning process of the connection pads 120.

In this case, signal interference may occur to cause a display device 3 failure. However, since the display device according to an embodiment further includes the third conductive film portion 137 in an area where the connection pad 120 and the connection wiring 110 are disposed to overlap each other along the first direction DR1, the adhesion force between the printed circuit board 300 and the display panel 100 and 200 may increase. Further, since this display device includes the non-conductive film portion 135 disposed between the adjacent third conductive film portions 137, it is possible to prevent a short circuit from occurring due to a portion protruding from the connection pad 120 corresponding to the connection wiring 110 in the right direction of the second direction DR2, a portion protruding from the connection pad 120 corresponding to the connection wiring 110 in the left direction of the second direction DR2, and the conductive material.

In some embodiments, the fourth base bonding layer 137a may include a material different from the constituent material of the third base bonding layer 135a of the aforementioned non-conductive film portion 135. For example, the fourth base bonding layer 137a includes the same material as the first base bonding layer 131a, thereby including an insulating resin having lower viscosity than the third base bonding layer 135a.

Figure 13:
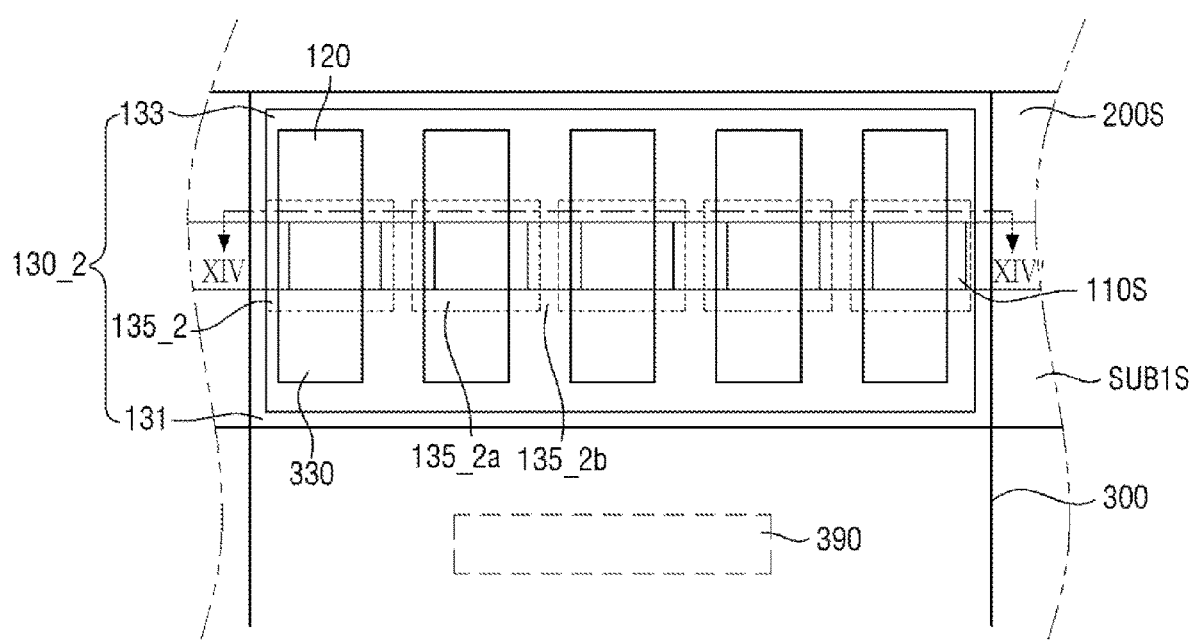
FIG. 13 is a side view of a display device constructed according to still another exemplary embodiment of the invention.
Figure 13:
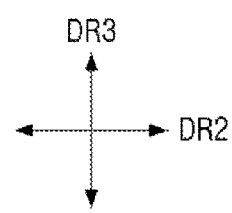
Figure 14:
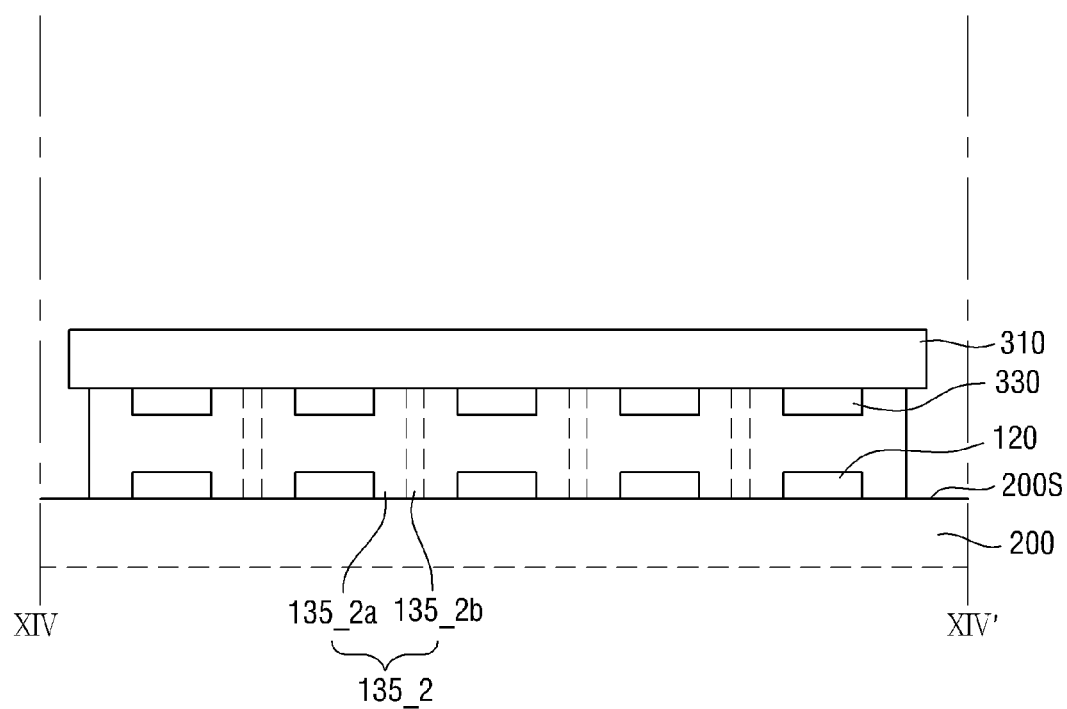
FIG. 14 is a cross-sectional view taken along the line XIV-XIV' of FIG. 13.

FIG. 13 is a side view of a display device according to still another embodiment, and FIG. 14 is a cross-sectional view taken along the line XIV-XIV' of FIG. 13.

Referring to FIGS. 13 and 14, a display device according to the present embodiment is different from the aforementioned display device in that a non-conductive film portion 135_2 of a coupling member 130_2 includes portions having different widths from each other in the thickness direction.

More specifically, the non-conductive film portion 135_2 may include a first sub non-conductive film portion 135_2a disposed to overlap the connection wiring 110 along the first direction DR1, and a second sub non-conductive film portion 135_2b disposed not to overlap the connection wiring 110 along the first direction DR1. The first sub nonconductive film portions 135_2a and the second sub nonconductive film portions 135_2b may be alternately arranged along the second direction DR2. The first sub-nonconductive film portion 135_2a may have a shape protruding more upwardly and downwardly from the second sub-conductive film portion 135_2b in the third direction DR3.

Even in the present embodiment, a short circuit may occur due to a portion protruding from the connection pad 120 corresponding to the connection wiring 110 in the right direction of the second direction DR2, a portion protruding from the connection wiring 110 corresponding to the adjacent connection pad 120, and the conductive material. For example, the width of the portion protruding from the connection pad 120 corresponding to the connection wiring 110 in the right direction of the second direction DR2 may be about 5 µm, and the pitch of the adjacent connection pad 120 may be about 22 µm. In the misalignment of the corresponding connection wiring 110, the connection wiring 110 disposed adjacent to the connection pad 120, and the connection pad 120, the alignment tolerance may be −5 µm to +5 µm during the laser patterning process of the connection pads 120.

In this case, signal interference may occur to cause a failure of the display device 2. However, since the display device 2 according to an embodiment includes a non-conductive film portion in which the coupling member 130 does not include a conductive material in an area where the connection pad 120 and the connection wiring 110 overlap each other along the first direction DR1, it is possible to prevent a short circuit from occurring due to a portion protruding from the connection pad 120 corresponding to the connection wiring 110 in the right direction of the second direction DR2, a portion protruding from the connection pad 120 corresponding to the connection wiring 110 in the left direction of the second direction DR2, and the conductive material.

Figure 15:
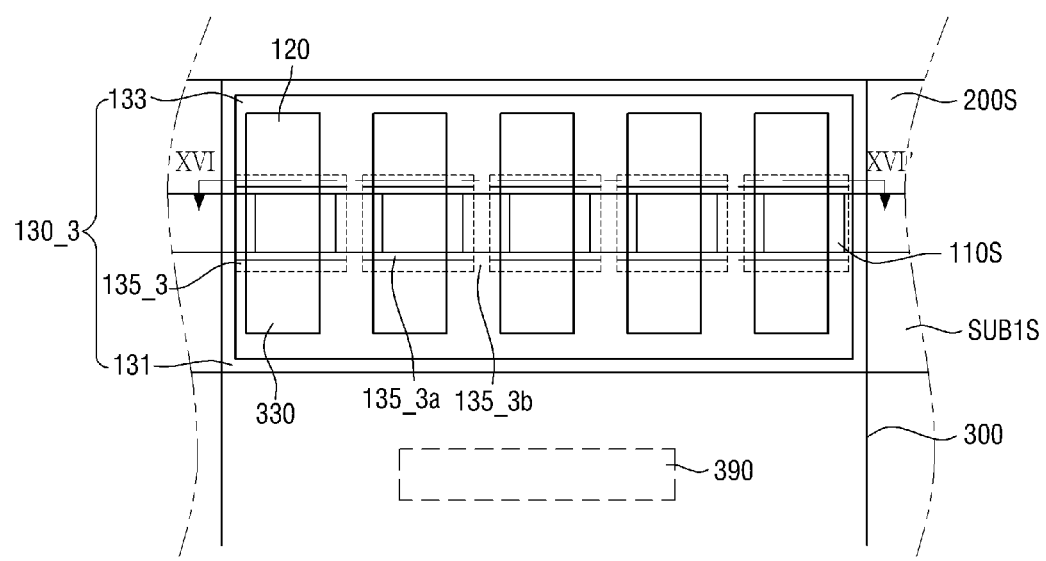
FIG. 15 is a side view of a display device constructed according to still another exemplary embodiment of the invention.
Figure 15:
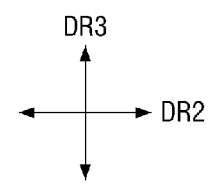
Figure 16:
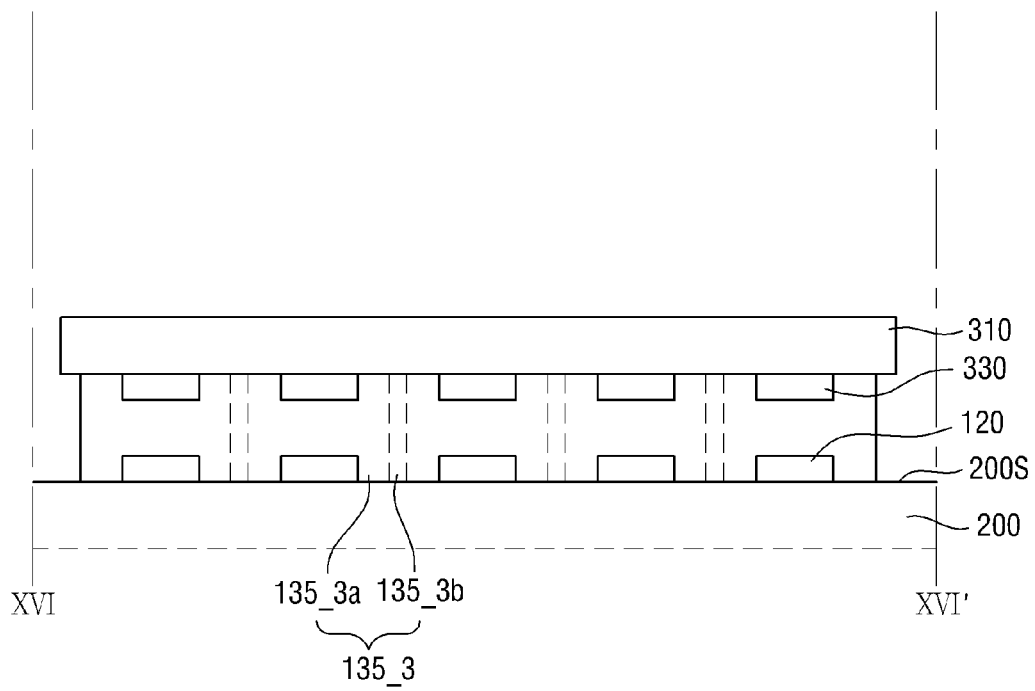
FIG. 16 is a cross-sectional view taken along the line XVI-XVI' of FIG. 15.

FIG. 15 is a side view of a display device according to still another embodiment, and FIG. 16 is a cross-sectional view taken along the line XVI-XVI' of FIG. 15.

Referring to FIGS. 15 and 16, a display device according to the present embodiment is different from the aforementioned display device in that a non-conductive film portion 135_3 of a coupling member 130_3 includes portions having different widths from each other in the thickness direction.

More specifically, the non-conductive film portion 135_3 may include a first sub non-conductive film portion 135_3a disposed to overlap the connection wiring 110 along the first direction DR1, and a second sub non-conductive film portion 135_3b disposed not to overlap the connection wiring 110 along the first direction DR1. The first sub nonconductive film portions 135_3a and the second sub nonconductive film portions 135_3b may be alternately arranged along the second direction DR2. The first sub-nonconductive film portion 135_3a may have a shape indented more upwardly and downwardly from the second sub-conductive film portion 135_3b in the third direction DR3.

Even in the present embodiment, a short circuit may occur due to a portion protruding from the connection pad 120 corresponding to the connection wiring 110 in the right direction of the second direction DR2, a portion protruding from the connection wiring 110 corresponding to the adjacent connection pad 120, and the conductive material. For example, the width of the portion protruding from the connection pad 120 corresponding to the connection wiring 110 in the right direction of the second direction DR2 may be about 5 μm, and the pitch of the adjacent connection pad 120 may be about 22 μm. In the misalignment of the corresponding connection wiring 110, the connection wiring 110 disposed adjacent to the connection pad 120, and the connection pad 120, the alignment tolerance may be −5 μm to +5 μm during the laser patterning process of the connection pads 120.

In this case, signal interference may occur to cause a failure of the display device 2. However, since the display device 2 according to an embodiment includes a non-conductive film portion in which the coupling member 130 does not include a conductive material in an area where the connection pad 120 and the connection wiring 110 overlap each other along the first direction DR1, it is possible to prevent a short circuit from occurring due to a portion protruding from the connection pad 120 corresponding to the connection wiring 110 in the right direction of the second direction DR2, a portion protruding from the connection pad 120 corresponding to the connection wiring 110 in the left direction of the second direction DR2, and the conductive material.

The display device according to an embodiment of the present invention can prevent signal interference due to the misalignment of connection wirings and connection pads.

The effects according to the present invention are not limited by the contents exemplified above, and other various effects are included in the present specification.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
a first substrate;
a second substrate facing the first substrate;
a coupling member; and
a printed circuit board attached to side surfaces of the first substrate and the second substrate,
wherein:
the first substrate comprises:
a display area including pixels;
a non-display area disposed around the display area;
a plurality of connection wirings connected to the pixels, extending along a first direction, spaced apart from each other along a second direction intersecting the first direction, and having a first thickness in a third direction intersecting the first and second directions; and
a plurality of connection pads arranged on a side surface of the first substrate and a side surface of the second substrate, connected to the connection wirings, extending along the third direction, and spaced apart from each other along the second direction;
the coupling member comprises:
a non-conductive film portion overlapping the connection wirings in the first direction, the non-conductive film portion comprising an insulating layer having a width greater than the first thickness in the third direction and having a second thickness defined in the first direction without any conductive material provided therein; and
a conductive film portion disposed around at least one side of the non-conductive film portion;
the coupling member is disposed between the printed circuit board and the side surface of the first substrate and between the printed circuit board and the side surface of the second substrate; and
the conductive film portion does not overlap each of the plurality of connection wirings along the first direction.

2. The display device of claim 1,
wherein the plurality of connection pads are directly connected to the plurality of connection wirings.

3. The display device of claim 2,
wherein the plurality of connection pads are partially misaligned with the plurality of connection wirings along the second direction.

4. The display device of claim 2,
wherein the conductive film portion overlaps the plurality of connection pads along the first direction.

5. The display device of claim 4,
wherein the conductive film portion includes a first base bonding layer and conductive balls dispersed in the first base bonding layer.

6. The display device of claim 5,
wherein the printed circuit board includes a lead wiring disposed to overlap the connection pad along the first direction, and the lead wiring is electrically connected to the connection pad through the conductive balls.

7. The display device of claim 5,
wherein the insulating layer of the non-conductive film portion includes a second base bonding layer.

8. The display device of claim 4, wherein the conductive film portion includes a first conductive film portion disposed at one side of the non-conductive film portion in third the third direction, and a second conductive film portion disposed at the other side of the non-conductive film portion in third the third direction.

9. The display device of claim 8,
wherein the first conductive film portion overlaps the first substrate along the first direction, and the second conductive film portion overlaps the second substrate along the first direction.

10. The display device of claim 1,
wherein the plurality of connection wirings include Ti/Al/Ti or Mo, and the plurality of connection pads includes Ag, Au, or Cu.

11. The display device of claim 1, further comprising:
a main circuit board connected to the printed circuit board,
wherein the printed circuit board includes a data driving integrated circuit.

12. The display device of claim 1,
wherein the first substrate includes a thin film transistor substrate, and the second substrate includes an encapsulation substrate.

13. The display device of claim 1, further comprising:
a liquid crystal layer disposed between the first substrate and the second substrate; and
a backlight unit disposed under the first substrate.

14. The display device of claim 1,
wherein the conductive film portion at least partially surrounds the non-conductive film portion.

15. The display device of claim 1, wherein the non-conductive film portion includes a first non-conductive film portion overlapping the plurality of connection wirings along the first direction, and a second non-conductive film portion disposed not to overlap the plurality of connection wirings along the first direction, and the first non-conductive film portion protrudes from the second non-conductive film portion in third the third direction.

16. The display device of claim 1, wherein the non-conductive film portion includes a first non-conductive film portion overlapping the plurality of connection wirings along the first direction, and a second non-conductive film portion disposed not to overlap the plurality of connection wirings along the first direction, and the second non-conductive film portion protrudes from the first non-conductive film portion in third the third direction.

17. A display device, comprising:
a first substrate including a display area including pixels, a non-display area disposed around the display area, and a base substrate; and
a second substrate facing the first substrate,
wherein the first substrate includes a connection wiring connected to the pixels, disposed on the base substrate, and extending along a first direction, and a connection pad disposed on a side surface of the first substrate and a side surface of the second substrate, connected to the connection wiring, and extending along a thickness direction,
the display device further includes a coupling member disposed on the side surface of the first substrate and the side surface of the second substrate,
the coupling member includes a non-conductive film portion overlapping the connection wirings along the first direction, and a conductive film portion disposed around the non-conductive film portion,
the conductive film portion includes a first base bonding layer and conductive balls dispersed in the first base bonding layer,
the non-conductive film portion includes a second base bonding layer, and
the second base bonding layer has higher viscosity than the first base bonding layer.

18. The display device of claim 17, further comprising:
a printed circuit board attached to side surfaces of the first substrate and the second substrate,
wherein the coupling member is disposed between the printed circuit board and the side surface of the first substrate and between the printed circuit board and the side surface of the second substrate.

19. The display device of claim 18,
wherein the printed circuit board includes a lead wiring overlapping the connection pad along the first direction, and the lead wiring is electrically connected to the connection pad through the conductive balls.

20. A display device, comprising:
a first substrate including a display area having pixels, a non-display area disposed around the display area, a plurality of connection wirings connected to the pixels, extending along a first direction, and spaced apart from each other along a second direction intersecting the first direction, and a plurality of connection pads arranged on a side surface of the first substrate and a side surface of the second substrate, connected to the connection wirings, extending along a thickness direction, and spaced apart from each other along the second direction;
a second substrate facing the first substrate;
a coupling member including a non-conductive film portion overlapping the connection wirings along the first direction, and a conductive film portion disposed around at least one side of the non-conductive film portion; and
a printed circuit board attached to side surfaces of the first substrate and the second substrate,
wherein the coupling member is disposed between the printed circuit board and the side surface of the first substrate and between the printed circuit board and the side surface of the second substrate,
wherein the plurality of connection pads are directly connected to the plurality of connection wirings,
wherein the conductive film portion includes a first base bonding layer and conductive balls dispersed in the first base bonding layer,
wherein the non-conductive film portion includes a second base bonding layer, and
wherein the second base bonding layer has higher viscosity than the first base bonding layer.

* * * * *